United States Patent

[11] 3,595,345

[72] Inventor Howard W. Wachenheim
 2525 Ward St., Apt. G-8, Smyrna, Ga. 30080
[21] Appl. No. 834,409
[22] Filed June 18, 1969
[45] Patented July 27, 1971

[54] BRAKE ASSEMBLY MECHANISM
 4 Claims, 4 Drawing Figs.
[52] U.S. Cl.................................................. 188/72.4,
 188/73.1, 188/218 XL, 188/370, 192/85 AA, 192/107 R
[51] Int. Cl....................................................... F16d 55/02
[50] Field of Search............................................ 188/71.6,
 72.4, 72.5, 152, 873, 218, 73.1; 192/107, 85 A

[56] References Cited
UNITED STATES PATENTS

| | | | |
|---|---|---|---|
| 2,610,719 | 9/1952 | Hornbostel | 188/218 AXIAL UX |
| 3,312,313 | 4/1967 | Moyer | 188/72.5 X |
| 3,348,636 | 10/1967 | Boyles | 188/72.5 X |
| 3,385,410 | 5/1968 | Hornbostel, Jr. | 188/72.44 X |
| 3,405,784 | 10/1968 | Biabaud | 188/218 AXIAL X |
| 3,495,689 | 2/1970 | Peach | 188/72.4 |

Primary Examiner—George E. Halvosa
Attorney—Cushman, Darby and Cushman

ABSTRACT: A disc-type brake assembly is described in which the braking disc is an annular member having stopping surfaces facing laterally of the wheel. The disc is a hollow cast member having a plurality of radial passageways extending from the radially inner edge to the radially outer edge of the disc for cooling purposes, and the disc is divided circumferentially into two semicircular sections with the ends of the sections being spaced sufficiently to allow thermal expansion of the sections. The disc sections are fixedly attached to the wheel either by screws extending radially from the wheel into the radially outer edge of the disc or by projections integral with the disc and extending radially outwardly therefrom to engage with the wheel. In the latter form of attachment tension spring clips are used to join the disc sections at the ends thereof. An annular housing is provided which supports the radially inner edge of the disc member and has a plurality of cylinders extending radially outwardly therefrom on each side of the disc member so that the inner ends of the cylinders in effect from sidewalls for the housing partially enclosing the lateral surfaces of the disc. Each cylinder has an open end therein adjacent the braking disc and a closed end remote therefrom. A piston is provided in each cylinder which is operated hydraulically to travel axially of the cylinder toward the disc exerting a lateral force thereon for braking purposes. In addition to the cylinders being integral with the housing a conduit is formed integrally within the housing and cylinders continuously connecting each of the cylinders communicating the fluid thereto for the exertion of hydraulic pressure on the pistons. The cylinders are arranged circumferentially so that, while opposed pairs of cylinders are formed from cylinders on opposite sides of the disc, the cylinders in each pair are circumferentially spaced one from the other so that ready access may be had to the interior of each of the cylinders.

PATENTED JUL 27 1971

INVENTOR

HOWARD W. WACHENHEIM

BY Cushman, Darby & Cushman
ATTORNEYS

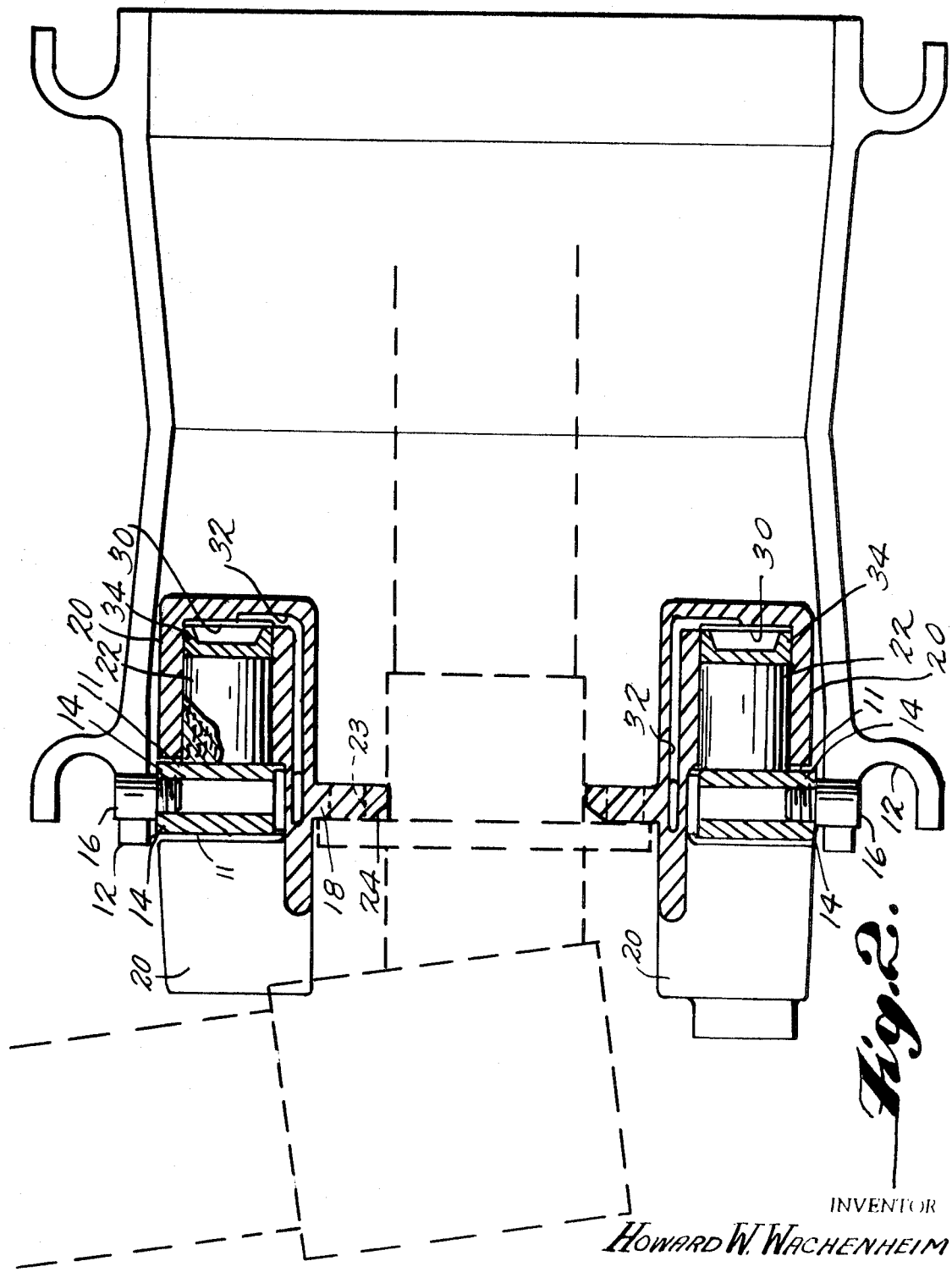

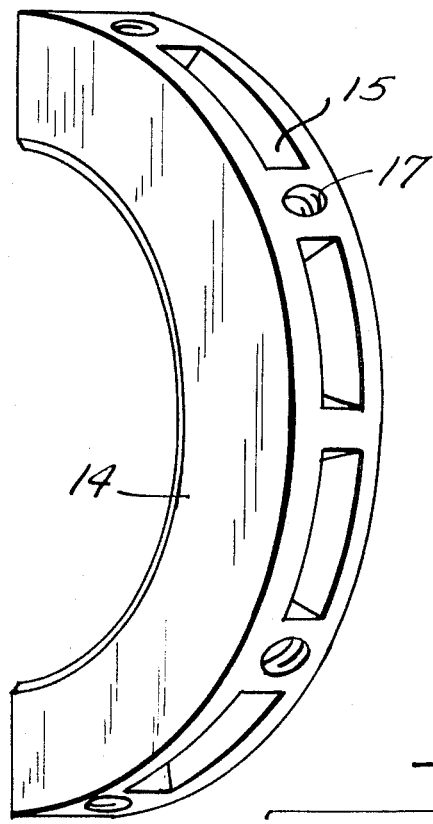
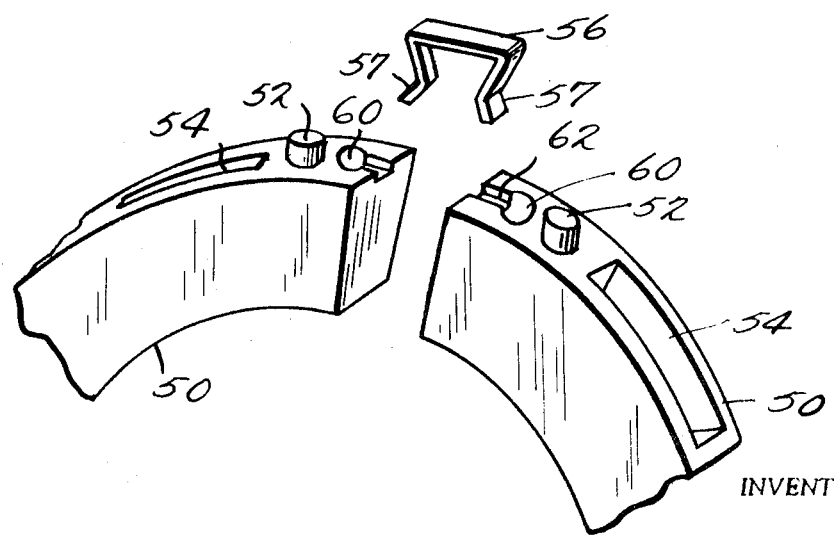

BRAKE ASSEMBLY MECHANISM

This invention relates to a brake assembly for a vehicle wheel and in particular, to disc-type brakes in which a hydraulically operated piston is used to exert a lateral force on the disc to stop rotation of the wheel.

An object of this invention is to provide an improved disc brake construction in which the brake cylinders and the housing are of a single piece or unitary construction. By constructing the housing and brake cylinders in this manner, a relatively lighter and more durable construction is achieved, and the use of a disc fixed to the wheel is permitted instead of the key/keyway or tang set connecting configurations found in the prior art devices. Further, manufacture of the brake assembly is greatly simplified due to the fact that bolting of the cylinders to the housing member and other assembly steps are eliminated, and machining of the parts is rendered less complex.

Another object of this invention is to provide a disc brake assembly having a one piece housing in which no cylinder heads are required as a separate part, and in which it is not necessary to provide sealing means for the closed end of the cylinders. This object is achieved in the brake assembly constructed according to the principles of this invention in which the cylinders are an integral part of the housing and in which the circumferential position of the cylinders is such that they may be readily machined from the open end thereof. In permitting machining from the open end of each cylinder it, of course, will not be required that the back or closed end of the cylinder be severed from the cylinder or otherwise opened for any reason thus obviating the need for providing sealing for this portion of the cylinder.

A further object of this invention is to provide a brake assembly in which the need for sealing the various connections of the hydraulic fluid line communicating with the cylinders is eliminated. In the brake assembly constructed according to the principles of this invention the fluid conduit is formed in and is integral with the cylinders and the housing member and extends continuously around the latter. Therefore, because of this integral construction, none of the conduit connections on the brake assembly itself need to be sealed. This feature, of course, insures the reliability of the brake assembly and obviates the need for frequent maintenance.

Still another object of this invention is to provide a brake assembly of integral housing construction having a braking disc in which distortion due to thermal stresses is substantially reduced or eliminated thereby enhancing the reliability of brake operation and increasing the life of the brake disc. This object is achieved in this invention by circumferentially dividing the brake disc into it least two sections with the ends thereof being sufficiently spaced to allow for thermal expansion of the disc sections. This construction in effect interrupts the thermal stresses providing differential thermal relief.

An additional object of this invention is to provide a disc brake assembly in which the area of the braking disc used or the area acted against by the pistons is significantly increased to substantially increase the life of the braking disc by spreading friction wear on the disc over substantially the entire disc. In the brake constructed according to the principles of this invention, pistons operate against each side of the braking disc in a circumferentially staggered opposed relationship so that substantially the entire circumference of the braking disc is used to achieve the foregoing object. Furthermore, the life of the braking disc of this invention is significantly increased by the hollow cast construction providing disc for heat dissipation purposes.

The principles of the invention, by the utilization of which, the foregoing and other objects may be achieved will be best understood by reference to the description hereinbelow of preferred embodiments and by reference to the drawings in conjunction with said description in which: 6

FIG. 2 is a fragmentary cross-sectional view taken along the lines 2–2 of FIG. 1 in which only the details of the cylinder and piston construction are shown along with their structural relationship to the wheel and the braking disc, the wheel suspension being shown in dotted lines;

Figure 1:
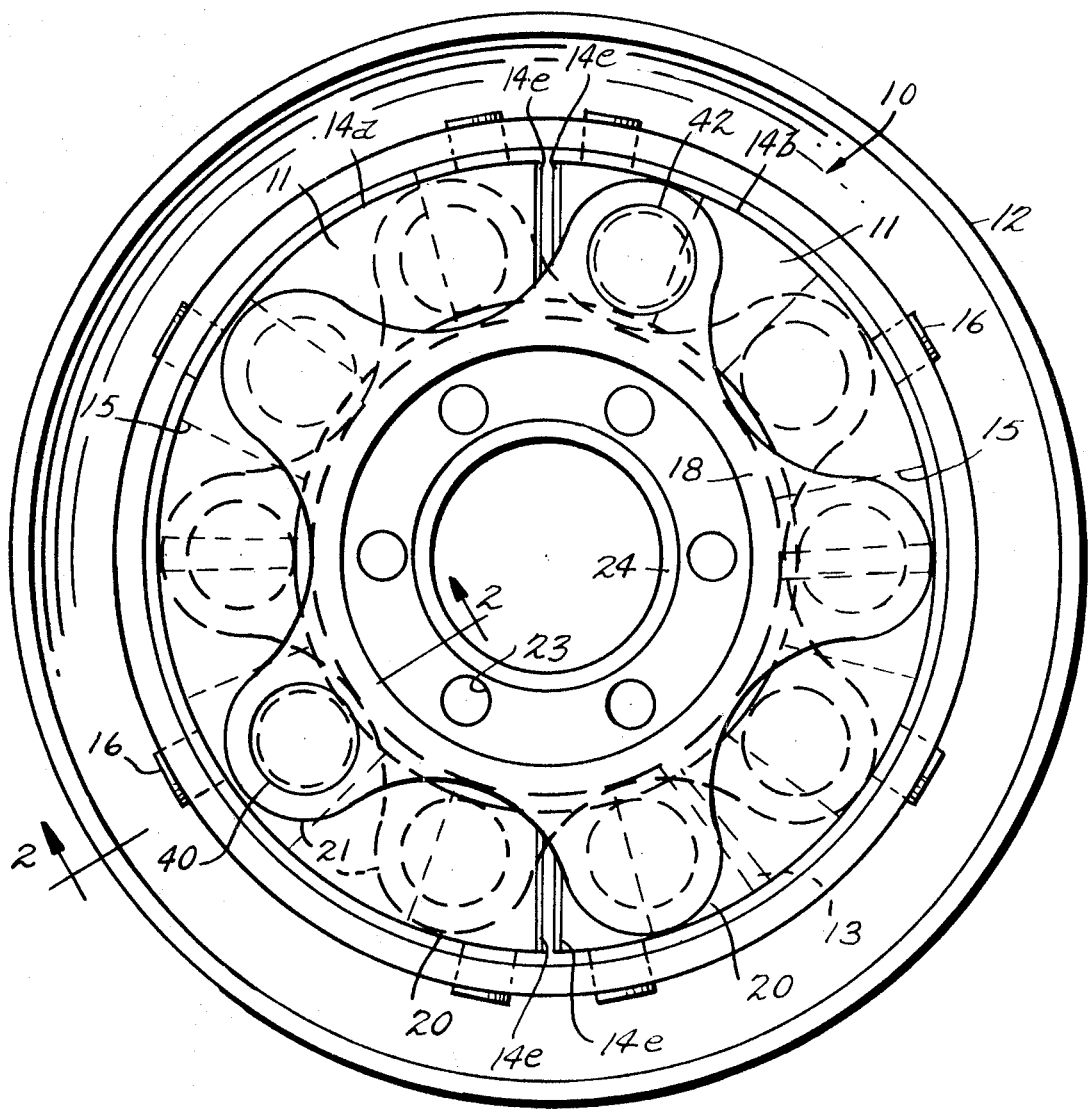
FIG. 1 is a side elevation of a preferred embodiment of the brake assembly constructed according to the principles of this invention shown mounted on a wheel.

FIG. 3 is a fragmentary perspective view of a first preferred embodiment of a braking disc constructed according to the principles of this invention; and FIG. 4 is a fragmentary perspective view of a second preferred embodiment of a braking disc constructed according to the principles of this invention in which the spring clip joining the sections thereof is shown exploded from its normal position joining the disc sections. Referring to FIGS. 1—3 for a detailed description of a preferred embodiment of this invention, it is to be noted that like numerals are used for purposes of identifying like elements in each of the figures. Furthermore, the braking disc used in the described assembly in these figures is the first preferred embodiment thereof shown in FIG. 3. The second preferred embodiment of the braking disc will be described further hereinbelow with reference to FIG. 4, and its structural relationship to the brake assembly will be discussed.

The brake assembly constructed according to the principles of this invention, generally indicated as 10, basically comprises a disc member 14 fixedly attached to a wheel 12, a housing 18 having integral therewith a plurality of cylinders 20, and pistons 22 in each cylinder which act against the braking disc in the well-known manner, briefly described hereinbelow, to stop rotation of the wheel.

The braking disc 14 is annularly shaped having laterally facing braking surfaces 11, and is preferably constructed from either cast or beryllium. The disc is divided into two sections in the preferred embodiment indicated at 14a and 14b respectively. When pistons 22 act against the surfaces 11, a significant amount of thermal energy will be generated within the braking disc, and this energy will be sufficient to create thermal stresses resulting in circumferential expansion which would tend to distort an annular disc of unitary construction. This difficulty is avoided by dividing braking disc 14 into sections with adjacent ends 14e of the sections being spaced one from the other only by an amount sufficient to allow for thermal expansion of the individual sections 14a and 14b It is to be noted that while only two sections are shown in the preferred embodiment, the disc may be divided into as many sections as desired or needed.

As best known in FIG. 3, the disc 14 is basically of a hollow cast construction so that a plurality of passageways extending from the radially inner edge of the disc to the radially outer edge of the disc are formed. The passageways 15 provide additional surfaces for the dissipation of heat from the disc 14. Spaced between the radial passageways 15 are a plurality of screw holes 17 in the radially solid portions of the disc 14. These screw holes facilitate the attachment of the disc to the wheel by means of screws 16 which extend radially through the wheel into the disc 14. To achieve maximum cooling it is desirable that passageways 15 be made as wide circumferentially of the disc as possible, and for this reason additional structural support of the passageways may be needed. As best shown in FIG. 1, strut members 13 may be provided within the passageways to give this added structural support. Any other suitable means for providing the needed support may be used, such as a thickening of the passageway wall at a point or points therealong.

The one piece brake housing 18 includes a flange member 24 with holes 23 in a circumferentially spaced relationship therearound for attaching the brake housing 18 to an axle housing or hub, as shown in FIG. 2. Cylinders 20 are constructed to be an integral part of the brake housing 18 with the diameters of the cylinders extending radially outwardly of the housing 18 so that an end of each cylinder is closely adjacent to one of the surfaces 11 of braking disc 14. The cylinders 20 are placed on either side of the braking disc 14 so that opposed pairs 21 of piston-cylinder arrangements are formed. Thus, opposed piston operation is provided maximizing the area of disc 14 used for braking purposes significantly enhancing the life of brake disc 14. The cylinders 20 in an opposed pair 21, however, are not placed directly opposite one another, but are in a circumferentially spaced relationship one to the other. In providing such a structural relationship of the cylinders 20 in a given opposed pair, it may be seen that the lateral entry into each of the cylinders is readily facilitated so that the interior of the cylinders 20 may be easily machined. By facilitating machining of the interior of the cylinders in this manner, it is not necessary to remove the ends of the cylinders remote from disc 14 to form the interiors of the cylinders, and this obviates the need for machining a cylinder head for proper fit and providing a means for sealing the cylinder head onto the cylinder. By constructing the cylinders 20 as an integral part of the remainder of the brake housing 18, it has been found that a relatively lighter and a much more durable structure is achieved. Furthermore, it can readily be seen that manufacture of such a housing is greatly simplified due to the fact that a major part of the assembly thereof has been eliminated.

The cylinders 20 each include an open end closely adjacent one of the lateral surfaces 11 of braking disc 14 and a closed end remote therefrom. Within each cylinder is placed a hydraulically actuated piston 22 which travels reciprocably axially in the cylinder. When the piston 22 is hydraulically forced outwardly of the cylinder 20 against the adjacent lateral surface 11, the lateral force on the surface 11 provides the necessary tangential friction force needed for braking purposes. The fluid provided for the needed hydraulic pressure is introduced into a space 30 between the closed end of cylinder 20 and piston 22. A seal 34 is provided to insure that space 30 is fluidtight by sealing the interstice between piston 22 and the interior wall of cylinder 20.

Fluid is communicated to space 30 by means of a conduit 32 which is cast in and is an integral part of the housing 18 and the cylinders 20. Conduit 32 extends around substantially the entire circumference of housing 18 with branches thereof extending through a wall of cylinder 20 communicating with spaces 30 in the cylinders. A fitting 40 is provided for connecting the conduit 32 to the vehicle brake line and the source of fluid, and a bleed plug 42 is provided for bleeding the excess air from conduit 32. It can be seen that constructing the conduit 32 as an integral part of the housing 18, the sealed connections which must otherwise be provided with conventionally used external conduits are not needed. This greatly simplifies the construction of the brake assembly, and it eliminates one of the most prevalent maintenance problems in such assemblies. That is, one of the most frequently needed repairs of such a brake assembly is the replacement of fluid seals therein, and this problem is completely avoided in the brake assembly constructed according to the principles of this invention by completely incorporating the conduit within the brake housing.

FIG. 4 illustrates an alternate embodiment of the braking disc 14. In this figure a braking disc 50 is shown divided into sections as was the case with braking disk 14. Instead of using screws for fixedly attaching the disc 50 to wheels 12, radial projections 52 integral with and extending radially from the radially outer edge of the disc 50 are provided. These projections 52 engage with appropriately shaped slots (not shown) in the wheel. It has been found that an unexpected advantage accrues to constructing the braking disc in this manner in that the annular passageways provided for cooling purposes, here indicated as 54, may be of an increased circumferential width without imparing the structural integrity of the disc 50. This particular disc construction will then permit more effective cooling. In order to secure the projections 52 into the slots in the wheel a tension force is needed, and this tension force is provided by a spring clip 56 having vertical legs 57. The vertical legs 57 fit into holes 60 in the disc 50, and the horizontal portion of spring clip 56 fits within a groove 62 in a disc 50 so that it does not protrude above the radially outer edge of disc 50. Furthermore, the radial thickness of disc 50 at the point of attachment of the spring clip 52 may be increased to further enhance the structural integrity of the disc.

It may be seen from the description given hereinabove of the preferred embodiments of this invention that the objects stated hereinabove are only exemplary and that the construction of the elements of the invention or their structural arrangement may readily be modified within the scope of the appended claims.

I claim:

1. A vehicle wheel brake assembly comprising an annular-shaped disc member having a pair of oppositely facing lateral braking surfaces, said disc being attached to said wheel at the radially outer edge of said disc, said disc member being divided into at least two sections with said sections being separated by a distance sufficient to permit thermal expansion of said sections, a plurality of passageways circumferentially spaced around said annular disc member and extending from the radially inner edge thereof to the radially outer edge, an annular housing supporting the radially inner edge of said disc member, a plurality of cylinders integral with said annular housing, the diameters of said cylinders extending radially outwardly of said annular housing, said cylinders having an open end adjacent said lateral braking surfaces and a closed end remote therefrom, said cylinders being positioned as to form opposed pairs separated by said disc member, each of said cylinders in an opposed pair being circumferentially spaced from the other a distance permitting lateral access to the interior of each said cylinder, a piston in each of said cylinders adapted to act under hydraulic pressure to travel reciprocably axially of said cylinder through said open end thereof exerting a force on said lateral braking surface and conduit means formed in said housing and said cylinders and extending continuously therearound for communicating a fluid to a space within each said cylinder between said closed end thereof and said piston causing the latter to travel outwardly of said cylinder toward said disc.

2. The vehicle wheel brake assembly defined in claim 1 wherein said disc is attached to said wheel by means of radially extending screws.

3. The vehicle wheel brake assembly defined in claim 1 wherein said disc includes projections integral therewith and extending radially therefrom for engagement with slots in said wheel thereby attaching said disc to said wheel, tension spring clips being provided joining adjacent ends of sections of said disc.

4. The vehicle brake assembly defined in claim 1 wherein said conduit means is formed in and is integral with said housing member.